United States Patent
Kasztenny et al.

(10) Patent No.: US 11,271,389 B2
(45) Date of Patent: Mar. 8, 2022

(54) DISTANCE PROTECTION USING SUPERVISED SEQUENCE CURRENTS AND VOLTAGES FOR ELECTRIC POWER DELIVERY SYSTEMS

(71) Applicant: Schweitzer Engineering Laboratories, Inc., Pullman, WA (US)

(72) Inventors: Bogdan Z. Kasztenny, Markham (CA); Mangapathirao Venkata Mynam, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 156 days.

(21) Appl. No.: 16/946,475

(22) Filed: Jun. 24, 2020

(65) Prior Publication Data
US 2021/0408782 A1   Dec. 30, 2021

(51) Int. Cl.
*H02H 7/22*    (2006.01)
*H02H 1/00*    (2006.01)

(52) U.S. Cl.
CPC ............ *H02H 7/22* (2013.01); *H02H 1/0007* (2013.01)

(58) Field of Classification Search
CPC ...... G01R 31/08; H02H 1/0007; H02H 3/042; H02H 3/26; H02H 3/265; H02H 3/28; H02H 3/32; H02H 3/36; H02H 3/38; H02H 3/382; H02H 3/40; H02H 7/22
See application file for complete search history.

(56) References Cited

U.S. PATENT DOCUMENTS

| | | | |
|---|---|---|---|
| 4,420,788 | A | 12/1983 | Wilkinson |
| 4,821,137 | A | 4/1989 | Wilkinson |
| 5,140,492 | A | 8/1992 | Schweitzer |
| 5,367,426 | A | 11/1994 | Schweitzer |
| 5,790,418 | A | 8/1998 | Roberts |
| 6,028,754 | A | 2/2000 | Guzman-Casillas |
| 6,046,895 | A | 4/2000 | Jurisch |
| 6,239,959 | B1 | 5/2001 | Alexander |

(Continued)

OTHER PUBLICATIONS

J.G. Andrichak, G.E. Alexander, "Distance Relay Fundamentals" Mar. 2007.

(Continued)

*Primary Examiner* — Jared Fureman
*Assistant Examiner* — Nicolas Bellido
(74) *Attorney, Agent, or Firm* — Richard M. Edge

(57) ABSTRACT

Distance protection for electric power systems disclosed herein uses an operating signal and a sequence polarizing signal made up of a supervised sequence current and a supervised sequence voltage. The polarizing signal may be determined based on the fault type and may be weighted toward sequence currents or sequence voltages depending on the power system conditions. For phase-to-ground faults, the sequence currents may include negative-sequence and zero-sequence currents. For phase-to-phase faults, the sequence currents may include negative-sequence currents. The current portion of the sequence polarizing signal may be weighted based on detection of insufficient negative-sequence current magnitude, standing unbalance, current transformer saturation, open pole, three-phase fault, and the like. The distance elements described herein provides improved protection during real-world power system conditions and changes.

21 Claims, 5 Drawing Sheets

(56) References Cited

U.S. PATENT DOCUMENTS

| | | | |
|---|---|---|---|
| 7,345,862 B2* | 3/2008 | Schweitzer, III | H02H 3/40 |
| | | | 361/80 |
| 8,183,871 B2* | 5/2012 | Saha | G01R 31/088 |
| | | | 324/522 |
| 8,410,785 B2 | 4/2013 | Calero | |
| 8,675,327 B2 | 3/2014 | Kasztenny | |
| 9,257,827 B2 | 2/2016 | Calero | |
| 9,594,112 B2* | 3/2017 | Schweitzer, III | G01R 31/40 |
| 9,941,684 B2 | 4/2018 | Calero | |
| 10,114,052 B2 | 10/2018 | Kasztenny | |
| 10,641,815 B2 | 5/2020 | Kasztenny | |
| 10,978,866 B2* | 4/2021 | Kasztenny | H02H 1/0092 |
| 2006/0152866 A1 | 7/2006 | Benmouyal | |
| 2008/0239602 A1 | 10/2008 | Kasztenny | |
| 2011/0068803 A1* | 3/2011 | Calero | H02H 3/402 |
| | | | 324/511 |
| 2014/0236502 A1* | 8/2014 | Calero | H02H 1/0092 |
| | | | 702/58 |
| 2016/0334469 A1* | 11/2016 | Calero | H02H 3/042 |
| 2020/0103455 A1* | 4/2020 | Kasztenny | G01R 31/2836 |
| 2020/0106261 A1 | 4/2020 | Kasztenny | |

OTHER PUBLICATIONS

Edmund O. Schweitzer III, Bogdan Kasztenny, "Distance Protection: Why Have We Started with a Circle, Does it Matter, and What Else is Out There?" 44th Annual Western Protective Relay Conference, Oct. 2017.

Saeed Golestan, Josep M. Guerrero, "Conventional Synchronous Reference Frame Phase-Locked Loop is an Adaptive Complex Filter" IEEE Transactions on Industrial Electronics, vol. 62, No. 3, Mar. 2015.

Bogdan Kasztenny, Dale Finney, "Fundamentals of Distance Protection" 61st Annual Conference for Protective Relay Engineers, 2008.

Marcel Taberer, Jeremy Blair, "Real-World Troubleshooting With Microprocessor-Based Recloser Controls" 72nd Annual Conference for Protective Relay Engineers, College Station, Texas, Mar. 2019.

* cited by examiner

DISTANCE PROTECTION USING SUPERVISED SEQUENCE CURRENTS AND VOLTAGES FOR ELECTRIC POWER DELIVERY SYSTEMS

RELATED APPLICATION (none)

TECHNICAL FIELD

This disclosure relates to distance protection of electric power delivery systems using polarizing signals that include a supervised sequence current portion and a supervised sequence voltage portion. More particularly, this disclosure relates to determining supervising factors for the polarizing signal for use in electric power system distance protection.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
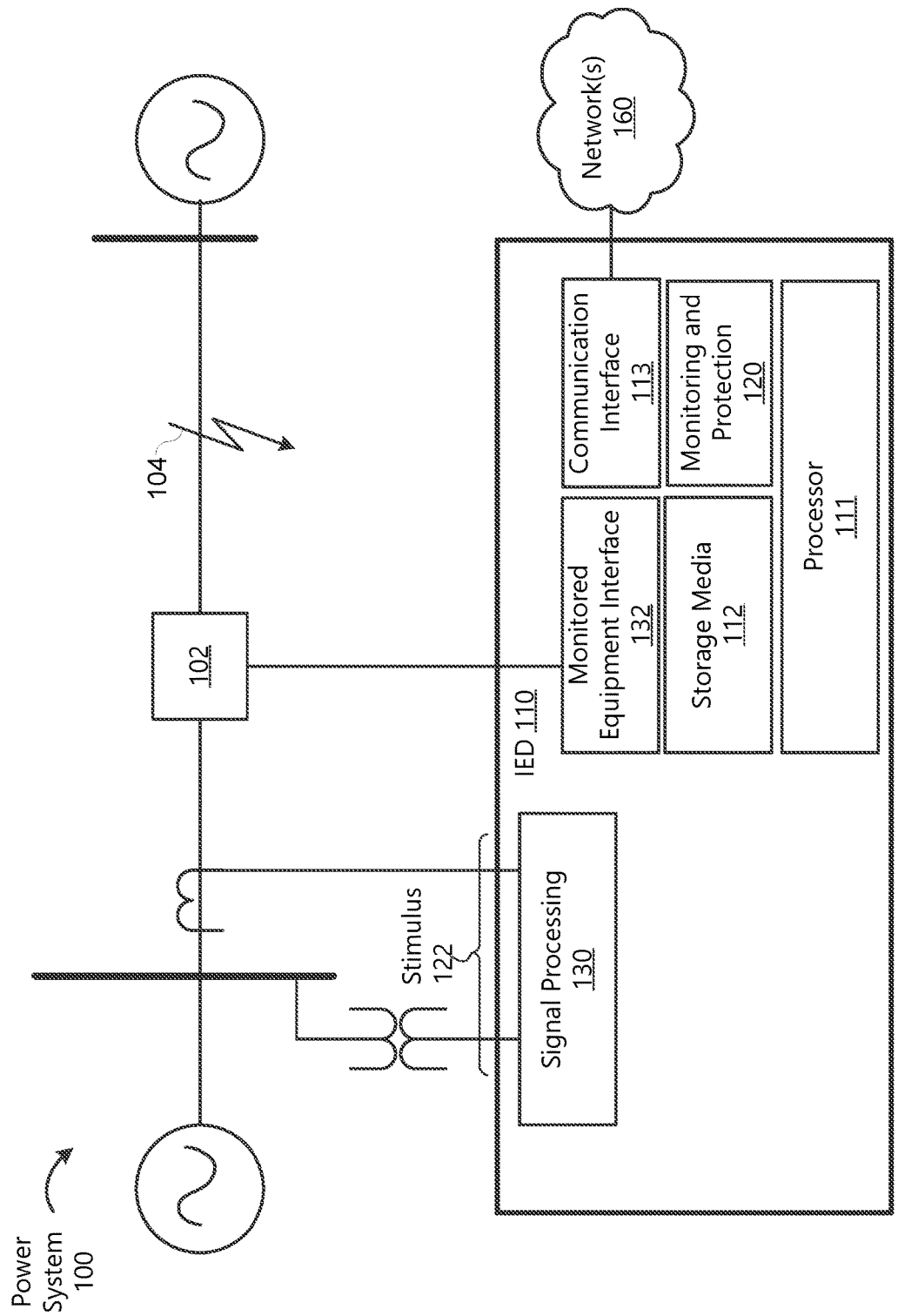
FIG. 1 illustrates a one-line diagram of an electrical power delivery system comprising an Intelligent Electronic Device (IED) implementing distance protection in accordance with several embodiments herein.

Electric power delivery systems are typically monitored and protected by IEDs that obtain voltage and current measurements from the power system. IEDs use those measurements to determine a condition of the power system, and effect a protective action (such as signaling a circuit breaker to trip) under certain determined conditions. A distance elements of an IED is configured to determine whether a fault condition exists within a zone of protection, such that a protective action may be taken when the fault condition is determined to be within the zone of protection, but the protective action is not taken (restrained) for faults outside of the zone of protection. IEDs may use voltage and current measurement from a relay location at the terminal of the power line together with a mathematical model to determine whether a fault is within the zone of protection. One such model is the distance element, which uses a comparison of an operating signal $S_{OP}$ and a polarizing signal $S_{POL}$ to determine whether the fault is within the zone of protection.

An operating signal may be a function of line impedance and measured voltages and currents. If the current at the fault point were measurable, those measurements could be used as the ideal polarizing signal. Because current measurements at the fault location are not available, traditional distance elements have used a substitute signal that has included a variety of functions of voltage and/or current measurements obtained at the line terminal. In general, a mho distance element may use a polarizing signal that is a function of voltage; and a quadrilateral distance element may use a polarizing signal that is a function of current. Previous distance elements have used negative-sequence current $I_2$ or zero-sequence current $I_0$ to calculate the polarizing signal. The particular current or voltage measurement to use for polarizing could be based on relay settings, which may have been determined using power system studies (e.g. short-circuit studies).

It has been observed, however, that the substitute signal may be appropriate for certain power system conditions, but may be less appropriate for certain other power system conditions. For example, if a system impedance changes from what is determined in the power system study, the accuracy of the substitute signal may also change, reducing the dependability and/or security of the distance element. Various conditions that may introduce errors into the determination of valid polarizing signal for a mho distance element includes, for example, very low voltage faults (e.g. bolted faults or faults near where the voltage signals are obtained). Distance elements that use symmetrical components (e.g. $I_0$, $I_2$) may experience errors for faults during an unbalance condition such as an open-pole, standing unbalance in the network, three-phase fault, current transformer (CT) saturation, insufficient sequence current magnitude, or the like. Further errors may be introduced for systems with low source inertia (e.g. inverter-controlled sources).

What is needed are systems and methods for electric power system distance protection that are reliable even under such conditions. Disclosed herein are improvements to electric power system protection, using improved polarizing signals for distance protection.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Several aspects of the embodiments described may be implemented as software modules or components or elements. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions. Software modules or components may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment.

FIG. 1 illustrates a one-line diagram of an electric power delivery system 100 monitored by an IED 110 that provides electric power system protection such as distance protection, overcurrent protection, and the like. The IED 110 may include a processor 111 for executing computer instructions, which may comprise one or more general purpose processors, special purposes processors, application-specific integrated circuits, programmable logic elements (e.g., FPGAs), or the like. The IED 110 may further comprise non-transitory machine-readable storage media 112, which may include one or more disks, solid-state storage (e.g., Flash memory), optical media, or the like for storing computer instructions, measurements, settings and the like. The IED 110 may be communicatively coupled to one or more networks 160 via one or more communication interfaces 113. The networks 160 may include special-purpose networks for monitoring and/or controlling the electrical power system 100 (e.g., SCADA networks, or the like). The networks 160 may further include general purpose communication networks, such as a TCP/IP network, or the like. The communication interface 113 may include wired and/or wireless communication interfaces (e.g., serial ports, RJ-45, IEEE 802.11 wireless network transceivers, etc.). In some embodiments, the IED 110 may include human-machine interface (HMI) components (not shown), such as a display, input devices, and so on.

The IED 110 may include a plurality of monitoring and protection elements, which may be described as a monitoring and protection module 120 that may be embodied as instructions stored on computer-readable media (such as storage media 112). The instructions, when executed on the processor 111, cause the IED to detect a fault. Upon detecting a fault, the instructions may cause the IED to take actions such as protective actions (signaling a circuit breaker to open the appropriate phases), displaying fault information, sending messages including the fault information, and the like. Methods disclosed herein may generally follow the instructions stored on media for distance protection.

The monitoring and protection module 120 may include a directional overcurrent element, a distance element, and the like. To detect the fault 104, the IED calculates polarizing and operating signals in accordance with several embodiments described herein, and compares the operating and polarizing signals to determine whether the fault is within a predetermined zone of protection (distance protection reach). The storage media 112 may include protective action instructions to cause the IED to signal a circuit breaker 102 to open via the monitored equipment interface 132, removing electric power from being fed to the fault upon detecting the fault and fault attributes such as a directional overcurrent condition and distance to the fault.

The IED 110 may obtain electrical signals (the stimulus 122) from the power system 100 through instrument transformers (CTs, voltage transformers (PTs), Rogowski coils, or the like). The stimulus 122 may be received directly via the measurement devices described above and/or indirectly via the communication interface 113 (e.g., from another IED or other monitoring device (not shown) in the electrical power system 100). The stimulus 122 may include, but is not limited to: current measurements, voltage measurements, equipment status (breaker open/closed) and the like.

The IED may include a signal processing module 130 to receive the electric power system signals and process the signals for monitoring and protection such as distance protection. Line currents and voltages may be sampled at a rate suitable for protection, such as in the order of kHz. An analog-to-digital converter (ADC) may create digital representations of the incoming line current and voltage measurements. The output of the ADC may be used in various embodiments herein. As described above, these voltage and current signals may be used to calculate operating and polarizing signals for use in various protection elements. In various embodiments the operating and polarizing signals may be calculated in the signal processing module 130. In other embodiments, the operating and polarizing signals may be calculated using the processor 111.

A monitored equipment interface 132 may be in electrical communication with monitored equipment such as circuit breaker 102. Circuit breaker 102 may be configured to selectively trip (open). The monitored equipment interface 132 may include hardware for providing a signal to the circuit breaker 102 to open and/or close in response to a command from the IED 110. For example, upon detection of a fault 104 and determining that the fault is within the zone of protection, the monitoring and protection module 120 may determine a protective action and effect the protective action on the power system by, for example, signaling the monitored equipment interface 132 to provide an open signal to the appropriate circuit breaker 102. Upon detection of the fault 104 and determination that the fault is within the zone of protection, the IED 110 may signal other devices (using, for example, the network 160, or signaling another device directly by using inputs and outputs) regarding the fault, which other devices may signal a breaker to open, thus effecting the protective action on the electric power delivery system.

Typical distance protection elements used in electric power system protection include various comparators joined by an AND gate. For example, a quadrilateral distance element may include a reactance comparator, a right blinder comparator, a left blinder comparator, a directional comparator, and/or a phase selection comparator. A mho distance element may include, among others, a mho comparator, phase selection comparator, and the like. As introduced above, certain comparators for distance protection may be expressed by two signals, namely, an operating signal $S_{OP}$ and a polarizing signal $S_{POL}$.

Figure 2:
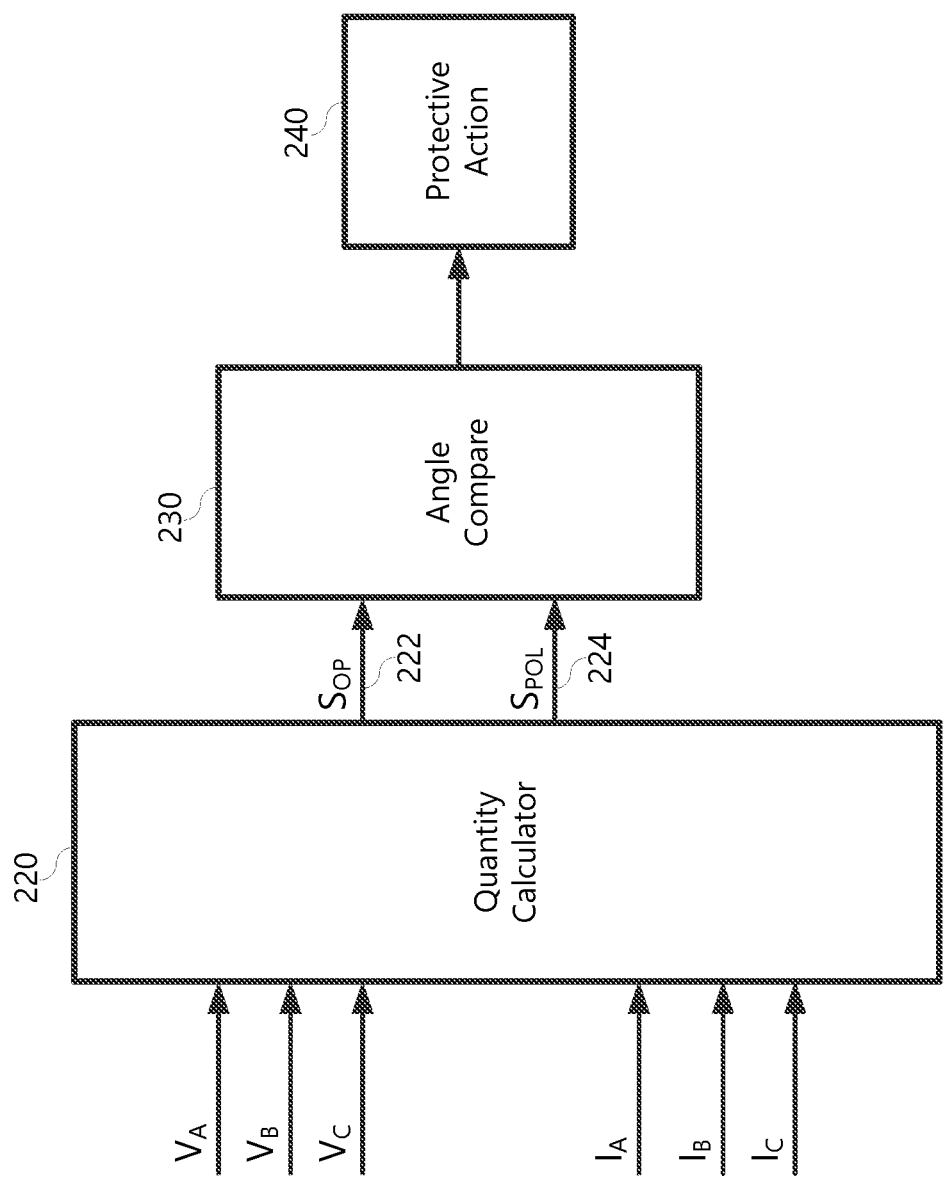
FIG. 2 illustrates a simplified block diagram for electric power system distance protection using operating and polarizing signals.

FIG. 2 illustrates a functional block diagram using electric power system voltage and/or current inputs to determine a protective action. For a three-phase power system, the three phase voltages $V_A$, $V_B$, and $V_C$ as well as the three phase currents $I_A$, $I_B$, and $I_C$ are used in a quantity calculator 220 to calculate the operating $S_{OP}$ 222 and polarizing $S_{POL}$ 224 signals in accordance with the embodiments described herein.

In steady states, the operating $S_{OP}$ 222 and polarizing $S_{POL}$ 224 signals are sinewaves. A comparator 230 asserts its output if the operating $S_{OP}$ and polarizing $S_{POL}$ signals are approximately in-phase (and a protective action may then be taken 240), but the comparator 230 keeps its output deasserted if the operating $S_{OP}$ and polarizing $S_{POL}$ signals are approximately out-of-phase. Assertion of the comparator is indicative that the fault is within the zone of protection. The operating threshold may be around 90 degrees. That is, if the angle between the $S_{OP}$ and $S_{POL}$ is less than 90 degrees in either direction, then the comparator asserts, and if the angle is greater than 90 degrees, the comparator remains deasserted. The threshold may be different than 90 degrees depending on the application.

Operating $S_{OP}$ and polarizing $S_{POL}$ signals may be calculated using voltages and currents from the electric power delivery systems. Equation 1 may be used to calculate operating signals:

$$S_{OP} = Ix \cdot Z_{DIR}$$

or $$S_{OP} = I \cdot Z_R - V \qquad \text{Eq. 1}$$

where:
- Ix is an operating current such as the phase current, the phase-to-phase current, the negative-sequence current, the zero-sequence current, or the distance loop current;
- $Z_{DIR}$ is the unity impedance that decides the maximum torque angle, or the nominal direction of the element for the directional element to assert;
- $I \cdot Z_R$ represents a voltage drop across the intended reach impedance $Z_R$ from the current at the relay location I; and
- V represents a voltage at the relay.

For the various phase-ground and phase-phase fault types, the operating signal may be calculated in accordance with Equations 2-7 as follows:

| Fault Type: | Operating Signal ($S_{OP}$): | |
|---|---|---|
| AG | IAG * $Z_R$ – VAG | Eq. 2 |
| BG | IBG * $Z_R$ – VBG | Eq. 3 |
| CG | ICG * $Z_R$ – VCG | Eq. 4 |
| AB | IAB * $Z_R$ – VAB | Eq. 5 |
| BC | IBC * $Z_R$ – VBC | Eq. 6 |
| CA | ICA * $Z_R$ – VCA | Eq. 7 | where:
- IAG represents current from A-Phase to ground;
- IBG represents current from B-Phase to ground;
- ICG represents current from C-Phase to ground;
- IAB represents current between A and B phases;
- IBC represents current between B and C phases;
- ICA represents current between C and A phases;
- VAG represents voltage from A-Phase to ground;
- VBG represents voltage from B-Phase to ground;
- VCG represents voltage from C-Phase to ground;
- VAB represents voltage between A and B phases;
- VBC represents voltage between B and C phases; and,
- VCA represents voltage between C and A phases.

It should be noted that the above are merely examples of the operating signal that may be used in the embodiments herein, and various or other operating signals may be used.

While the operating signal may be a function of current and/or voltage, the polarizing signal often depends on the particular distance element. For example, in a quadrilateral element, the polarizing signal is a function of the loop current of the fault (e.g. phase A-ground current for phase A-ground faults; phase A-B current for phase A-B faults; and so forth), wherein in a mho element, the polarizing signal may be a function of a voltage. Each of these approaches has advantages and drawbacks, as generally described above. Indeed, for certain power system conditions, voltages may be less accurate polarizing signals, whereas in other power system conditions, sequence currents may be less accurate polarizing signals. For example, during standing unbalance, CT saturation, three-phase fault, insufficient sequence current magnitude, or open-pole conditions, the sequence current signals lack accuracy for use as a polarizing signal in a distance element. Under low-voltage fault conditions such as close-in and/or bolted faults, the voltage signals lack sufficient accuracy for reliable for use in a polarizing signal in a distance element. Furthermore, it is noted that relay settings (including details of the polarizing signal to use) are often determined based on system studies. To the extent that the actual power system may vary from the assumed conditions of the system studies, the polarizing signal setting resulting from the studies are less reliable.

The embodiments described herein are improvements upon previous distance elements by using various combinations of power system signals to produce improved polarizing signals for use in distance protection. In accordance with various embodiments, the polarizing signal is a function of sequence currents and sequence voltages. As such, the polarizing signal retains validity even when the current signals or voltage signals may be compromised. The sequence current portion and the sequence voltage portion of the polarizing signal may be supervised to further weight use of a more accurate polarizing signal. Furthermore, the polarizing signal may be determined without dependence on system studies, which greatly reduces the amount of time and effort required to configure (set) the protective relay comprising the distance element. Indeed, the polarizing signals described herein are more robust, as they are not necessarily dependent on the assumed conditions used in system study.

In accordance with various embodiments, a polarizing signal may generally be a function of currents and voltages instead of only currents or only voltages. The voltage portion may be weighted by a supervising factor. Similarly, the current portion may be weighted by a current supervision factor. The current portion may be a combination of sequence currents, depending on the fault type. Finally, the combination of sequence currents may be a weighted combination of the zero- and negative-sequence currents.

In accordance with further embodiments, a plurality of polarizing signals may be used. The polarizing signals may include a sequence polarizing signal that is generally a weighted combination of sequence currents and a weighted sequence voltage; and a loop current polarizing signal that is a function of the loop currents involved in the fault. The operating signal may be compared against both polarizing signals, and a fault may be determined to be within the zone of protection if both comparisons result in fault determination. Loop current polarizing signals may be calculated as follows:

| Fault Type: | Loop Polarizing Signals ($S_{POL-L}$): |
|---|---|
| AG | IAG |
| BG | IBG |
| CG | ICG |
| AB | IAB |
| BC | IBC |
| CA | ICA | where:
- IAG represents current from A-Phase to ground;
- IBG represents current from B-Phase to ground;
- ICG represents current from C-Phase to ground;
- IAB represents current between A and B phases;
- IBC represents current between B and C phases; and,
- ICA represents current between C and A phases.

According to these embodiments, sequence polarizing signals $S_{POL-S}$ may include two general portions, namely, a supervised combination of sequence currents and a supervised sequence voltage. The supervised combination of sequence currents may be a product of a current supervising factor and a combination of sequence currents. The supervised combination of sequence voltages may be a product of a voltage supervising factor and sequence voltage. Further, the sequence voltage can be the present value of the voltage, a memorized value of the voltage prior to the disturbance, or a combination. In accordance with several embodiments herein, the sequence polarizing signals $S_{POL-S}$ may be calculated in accordance with Equations 8-13 as follows:

| Fault Type: | Sequence Polarizing Signals ($S_{POL-S}$): | |
|---|---|---|
| AG | $S_I(k_2 I_{2A} + k_0 I_0) + S_V V_1$ | Eq. 8 |
| BG | $S_I(k_2 I_{2B} + k_0 I_0) + S_V V_1$ | Eq. 9 |
| CG | $S_I(k_2 I_{2C} + k_0 I_0) + S_V V_1$ | Eq. 10 |
| AB | $S_I(k_2 I_{2A} + k_0 I_{2B}) + S_V V_1$ | Eq. 11 |
| BC | $S_I(k_2 I_{2B} + k_0 I_{2C}) + S_V V_1$ | Eq. 12 |
| CA | $S_I(k_2 I_{2C} + k_0 I_{2A}) + S_V V_1$ | Eq. 13 | where:
$S_I$ represents a current supervising factor;
$S_V$ represents a voltage supervising factor;
$k_0$ and $k_2$ represent sequence current weighting factors;
$I_0$ represents zero-sequence current;
$V_1$ represents positive-sequence voltage;
$I_{2A}$ represents negative-sequence current referenced to the A-phase;
$I_{2B}$ represents negative-sequence current referenced to the B-phase; and
$I_{2C}$ represents negative-sequence current referenced to the C-phase.

It should be noted that although the Equations 8-13 include the term $V_1$ the is described as representing a positive-sequence voltage, a number of voltage quantities may be used in place of positive-sequence voltage. For example, in various embodiments, quantities such as: a voltage from a healthy phase (i.e. cross-phase polarizing); present value voltage; memorized-value voltage; voltage combinations using voltages from the faulted-phase(s) and voltages from the healthy-phase(s); and the like may be used in the place of $V_1$. Voltage combinations may use less voltage from the faulted phase(s) and more voltage from the healthy phase(s) by weighting or the like.

In accordance with several embodiments herein, the operating signal $S_{OP}$ is compared against both of the polarizing signals $S_{POL-L}$ and $S_{POL-S}$. When both comparisons indicate a fault within the zone of protection, then the fault is declared. That is, when the operating signal $S_{OP}$ is substantially in-phase (e.g. within 90 degrees in either direction) with both polarizing signals $S_{POL-L}$ and $S_{POL-S}$, then a fault is determined to be within the zone of protection, and a protective action may be taken.

Figure 3A:
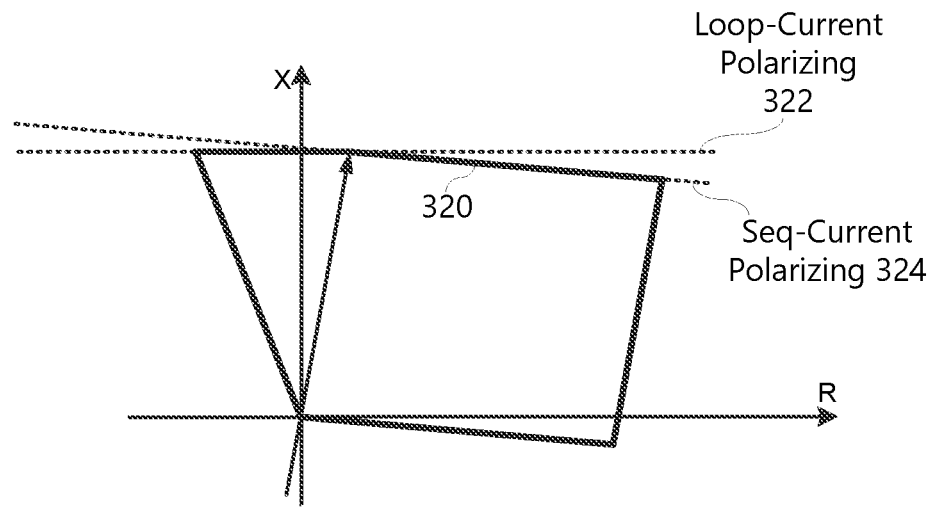
FIG. 3A illustrates an example of a distance operating characteristic during infeed conditions in accordance with several embodiments herein.
Figure 3B:
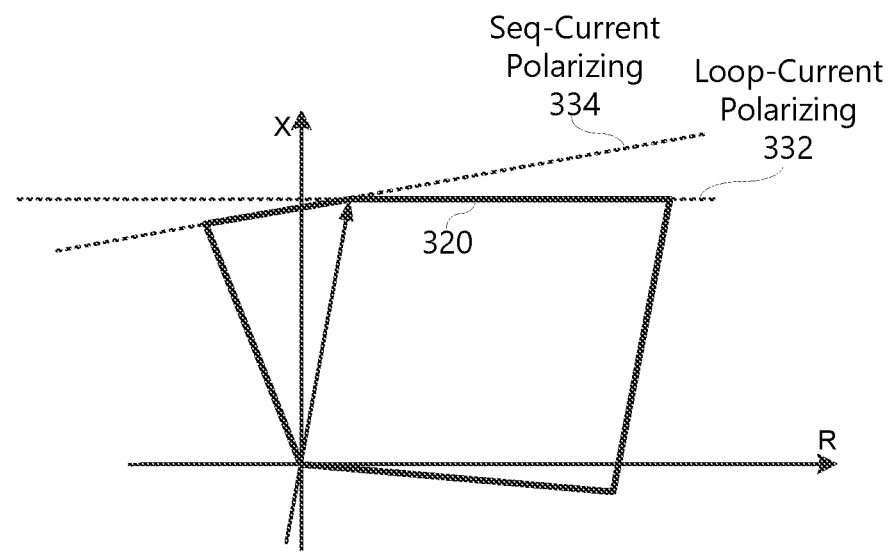
FIG. 3B illustrates an example of a distance operating characteristic during outfeed conditions in accordance with several embodiments herein.

FIGS. 3A and 3B illustrate plots of quadrilateral distance protection characteristics 320 in accordance with embodiments wherein the operating signal $S_{OP}$ must be within the operating region of both polarizing signals $S_{POL-L}$ and $S_{POL-S}$ for declaration of a fault within the zone of protection. FIG. 3A illustrates a loop-current polarizing element 322 associated with the loop current polarizing signal $S_{POL-L}$ and a sequence-current polarizing element 324 associated with the sequence polarizing signal $S_{POL-S}$ during an infeed condition. FIG. 3B illustrates a loop-current polarizing element 322 and a sequence-current polarizing element 324 during an outfeed condition. In both illustrations, the characteristic 320 of the distance element includes a reactance element that follows the sequence-current polarizing element and the loop-current polarizing element. This adds security to the distance element. Several embodiments herein simply implement and AND condition between the sequence-current polarization and the loop-current polarization, regardless of infeed or outfeed conditions, resulting in the characteristic illustrated in FIGS. 3A and 3B. Security of the distance element is increased over prior distance protection elements.

Figure 4:
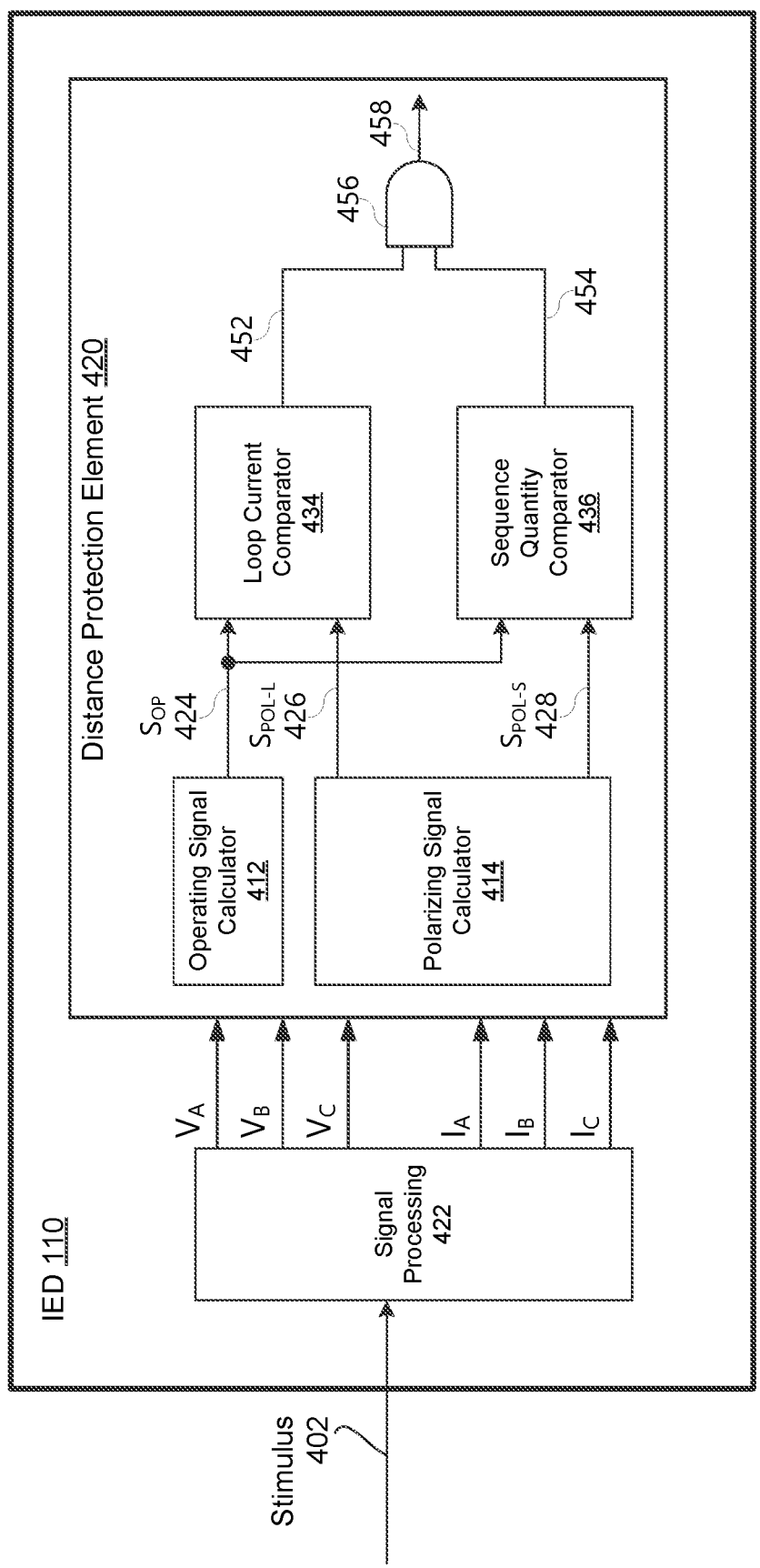
FIG. 4 illustrates a simplified block diagram of an IED including a distance protection element in accordance with several embodiments herein.

FIG. 4 illustrates a simplified block diagram of an IED 110 for implementing distance protection element improvements disclosed herein. The IED 110 may receive a stimulus 402 such as voltage and current signals from instrument transformers such as CTs, PTs, Rogowski coils, and the like. Stimulus 402 may include voltage and current signals in the form of digitized analogs, provided from merging units, other IEDs, or the like. Stimulus 402 may include voltage and current signals from other IEDs. The signals may be processed via signal processing 422 which may process the signals depending on their type for further processing. Signal processing 422 may include various filters, ADCs, and the like to produce phase voltages $V_A$, $V_B$, $V_C$ and phase currents $I_A$, $I_B$, and $I_C$ for use in various protection and monitoring elements of the IED 110.

As illustrated, the phase voltages and currents are used by the distance protection element 420 to determine if the fault is within the zone of protection. The distance protection element 420 may include an operating signal calculator 412 for determining an operating signal and a polarizing signal calculator 414 for determining one or more polarizing signals. The operating signal calculator 412 may determine and provide the operating signal $S_{OP}$ 424 as described above. The polarizing signal calculator 424 may determine and provide a loop polarizing signal $S_{POL-L}$ 426 and sequence polarizing signal $S_{POL-S}$ 428 as described above.

A loop current comparator 434 may use the operating signal $S_{OP}$ 424 and loop polarizing signal $S_{POL-L}$ 426 to determine whether the fault is within the zone of protection, and assert signal 452. The loop current comparator 434 may compare the operating signal $S_{OP}$ 424 and the loop polarizing signal $S_{POL-L}$ 426. In accordance with various embodiments, an angle between the operating signal $S_{OP}$ 424 and the loop polarizing signal $S_{POL-L}$ 426 may be compared and the comparator asserts if the angle is within a predetermined threshold.

A sequence quantity comparator 436 may use the operating signal $S_{OP}$ 424 and sequence polarizing signal $S_{POL-S}$ 428 to determine whether the fault is within the zone of protection, and assert signal 454. The sequence quantity comparator 436 may compare the operating signal $S_{OP}$ 424 and the sequence polarizing signal $S_{POL-S}$ 428. In accordance with various embodiments, an angle between the operating signal $S_{OP}$ 424 and the sequence polarizing signal $S_{POL-S}$ 428 may be compared and the comparator asserts if the angle is within a predetermined threshold.

The loop current comparator 434 and the sequence quantity comparator 436 may assert signals to AND gate 456. If both the current comparator signal 452 and the sequence quantity comparator signal 454 are present, then AND gate 456 asserts distance fault signal 458 indicating that the fault is within the zone of protection associated with the distance element 420. Upon assertion of the distance fault signal 458, the IED 110 may effect a protective action such as tripping a breaker, displaying the fault determination, or sending a message indicating the fault determination, as has been described above in association with FIG. 1.

Figure 5:
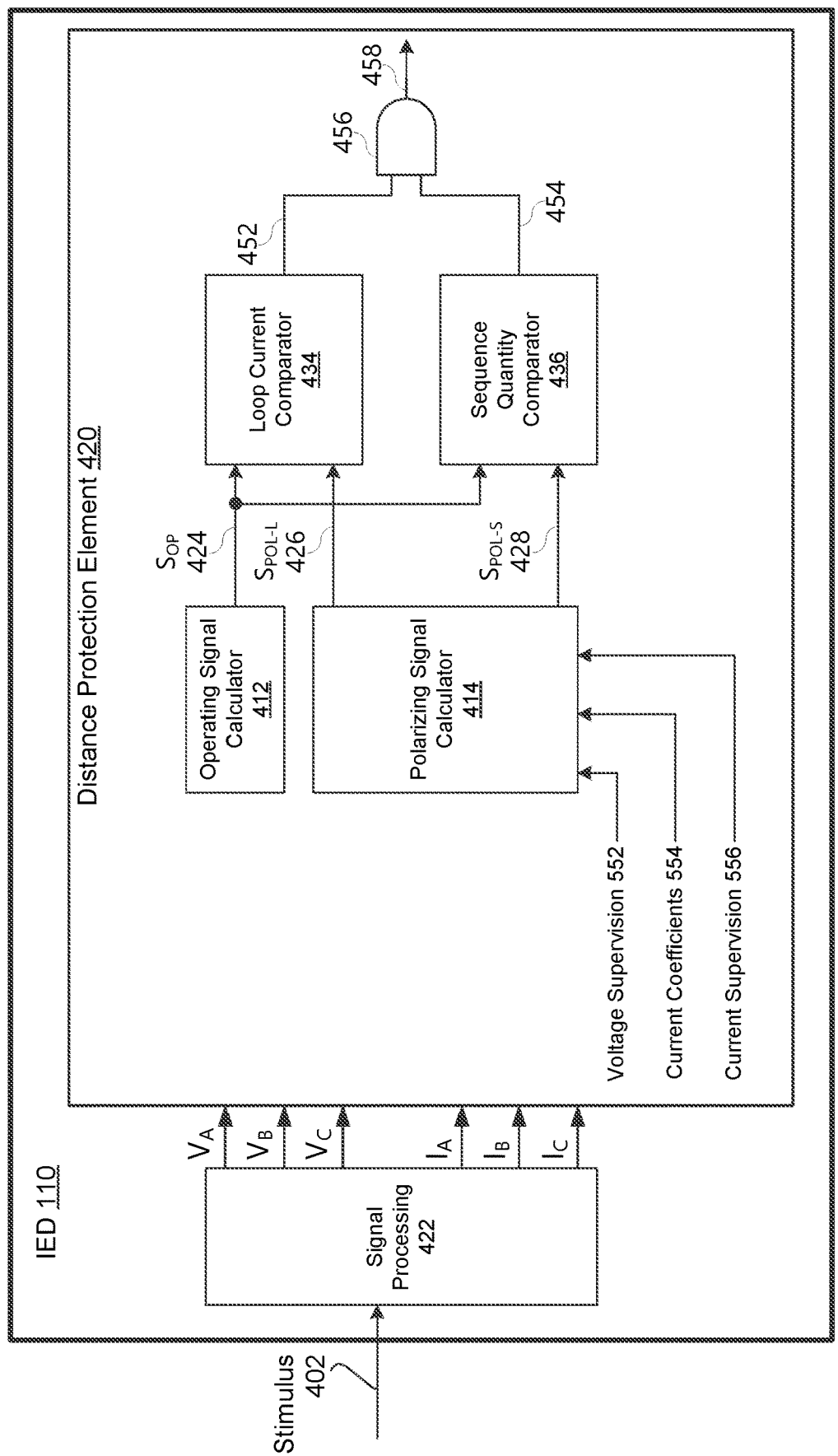
FIG. 5 illustrates a simplified block diagram of an IED including a distance protection element using supervising factors and coefficients in accordance with several embodiments herein.

FIG. 5 illustrates a block diagram of an IED 110 with further improvements in distance protection. The distance protection element 420 includes further voltage and current weighting and supervision to result in a more useful polarizing signal for distance protection. As has been noted above, certain power system conditions may result in current and/or voltage signals that are not sufficiently accurate for use in reliable polarizing. For example, a fault exhibiting a low voltage signal (such as, for example, a close-in or bolted fault) may produce a voltage signal that has insufficient magnitude and/or angle such that it is less accurate for use in distance protection. Various other conditions such as an open phase (open pole), CT saturation, standing unbalance, three-phase fault, insufficient sequence current magnitude, and the like may result in current signals (including sequence current signals) of reduced accuracy for use in distance protection. To improve utility of distance protection even under such power system conditions, the polarizing signal may be a function of weighted sequence currents (using current coefficients 554), voltage supervising factors (from the voltage supervision 552), and current supervising factors (from the current supervision 556).

In accordance with several embodiments, the sequence polarizing signal $S_{POL-S}$ may be calculated in accordance with Equations 8-13, above. The current supervising factor $S_I$, voltage supervising factor $S_V$, and first and second sequence current weighting factors $k_0$, $k_2$, may be settings, or may be determined by the IED using input signals. As illustrated, the polarizing signal calculator 414 may receive such inputs from the voltage supervision 552, current coefficients 554, and current supervision 556.

The current coefficients 554 may include first and second sequence current weighting factors $k_0$, $k_2$. These factors may be selected or determined to equally or unequally weight the sequence current signals used in the sequence polarizing signal $S_{POL-S}$. In accordance with various embodiments, the first and second sequence current weighting factors $k_0$, $k_2$, may be selected to equally weight the sequence current signals. In various embodiments, the equal weighting may be an average of the sequence current signals (e.g. $k_0=k_2=0.5$). In various embodiments, the default settings of the IED 110 is such that the current portion of the sequence polarizing signal is an average of the relevant sequence currents. In various embodiments, the first and second current weighting factors $k_0$, $k_2$, may be user settings.

In various other embodiments, the sequence current weighting factors $k_0$, $k_2$, may be dynamically calculated. The current weighting factors may be calculated based on sequence current magnitudes meeting predetermined thresholds. For example, if magnitudes of both of the sequence (zero- and negative-sequence) currents of the sequence current portion meet predetermined thresholds, then the weighting factors $k_0$, $k_2$ may be selected to equally weight the sequence currents. Should the magnitude of one of the sequence currents not meet a predetermined threshold, then the weighting factors $k_0$, $k_2$ may be selected to give less weight to the sequence current not meeting the threshold. Similarly, if the magnitude of a particular sequence current is under a predetermined minimum threshold, the weighting factors $k_0$, $k_2$ may be selected to give less or no weight to that particular sequence current. The distance protection element 420 may include access to the current coefficient settings, or include a current coefficient calculator for determining the current coefficients 554.

Accordingly, the sequence current portion of the sequence polarizing signal may be reliable even if one or the other of the sequence currents is less reliable. For example, even if the negative-sequence current signal is unreliable, using the weighted combination of the negative-sequence current signal and the zero-sequence current signal would result in a polarizing signal that is more reliable than if only the less-accurate signal(s) were used.

The voltage supervising factor $S_V$ may be a user setting, may be calculated based on other user settings, or may be dynamically calculated. In one embodiment, the voltage supervising factor $S_V$ includes a function of nominal voltages and currents. The function may be a factor of a ratio of a nominal current (such as a nominal secondary current, system current, or the like) and a nominal system voltage.

In various other embodiments, the voltage supervising factor $S_V$ of the voltage supervision signal 552 may be dynamically calculated. The distance protection element may include a voltage supervision factor calculator that determines the voltage supervising factor using settings and/or power system signals. In various embodiments, the voltage supervising factor $S_V$ may be at or near zero. For example, if it is determined that the voltage signal is not sufficiently accurate for polarizing, the voltage supervising factor $S_V$ may be reduced to at or near zero. The voltage signal may be deemed inaccurate upon detection of a bolted fault, a close-in fault, or the like.

The current supervising factor $S_I$ may be used to weight the sequence current portion of the sequence polarizing signal $S_{POL-S}$. The current supervising factor $S_I$ may be used to reduce the weight of the sequence portion of the sequence polarizing signal (relative to the voltage portion) under certain power system conditions when the sequence currents may be less accurate polarizing signals. The current supervising factor $S_I$ may be zero under certain conditions to remove the sequence current portion of the sequence polarizing signal $S_{POL-S}$. The distance protection element 420 may include a current supervision calculator for determining the current supervision signal 556 (with the supervising factor $S_I$) for use by the polarizing signal calculator 414.

The current supervising factor $S_I$ may be dynamically calculated based, at least in part, on power system conditions or equipment conditions. The power system conditions may be determined using signals from the power system such as, for example, the phase voltages, phase currents, and equipment status signals (breaker open/closed, and the like). In various embodiments, the current supervising factor $S_I$ may be determined based on insufficient sequence current magnitude. That is, the current supervision signal $S_I$ may be determined based on sufficiency of a magnitude of a sequence current to be used in the sequence polarizing signal $S_{POL-S}$. For example, when the magnitude of a sequence current to be used is below a predetermined threshold, the current supervision signal $S_I$ may be reduced, even to zero, effectively eliminating the sequence current portion of the sequence polarizing signal $S_{POL-S}$. More specifically, when the fault is a phase-to-ground fault, a magnitude of the negative-sequence current may be compared against a predetermined threshold. If the magnitude is below the threshold, the current supervision signal $S_I$ may be determined as zero, and provided to the polarizing signal calculator 414. Accordingly, when the current signal is a less accurate polarizing signal, the improvement herein reduces the contribution of the current signal to the polarizing signal, thus improving the distance protection element.

In other embodiments, the current supervising signal $S_I$ may be determined based on an open-pole (open-phase) condition. The open-pole condition may be determined using the phase current signals. For example, when a current magnitude of one phase drops to zero, or near zero, then an open-pole condition may be determined. Similarly, if a breaker or switch status for a particular phase is "open" or "tripped", then it may be determined that an open-pole condition exists. When an open-pole condition is determined, the sequence current supervision signal $S_I$ may be reduced; or even set to zero, effectively eliminating the sequence current portion of the sequence polarizing signal $S_{POL-S}$. Accordingly, when the current signal is less accurate due to an open-pole condition, the improvement herein reduces the contribution of the current signal to the polarizing signal, thus improving the distance protection element.

In another embodiment, the current supervising signal $S_I$ may be determined based on determination of a three-phase fault. The three-phase fault may be determined using the phase current signals, phase voltage signals, or may be determined based on other signals or communications from other IEDs. Nevertheless, when a three-phase fault is detected, the sequence current supervision signal $S_I$ may be reduced; or even forced to zero, effectively eliminating the sequence current portion of the sequence polarizing signal $S_{POL-S}$. Accordingly, when the sequence current signal is less accurate due to a three-phase fault condition, the improvement herein reduces the contribution of the sequence current signal to the polarizing signal, thus improving the distance protection element.

In another embodiment, the current supervising signal $S_I$ may be determined based on a standing unbalance condition. The standing unbalance condition may be determined using the phase current signals, phase voltage signals, or the like. In one particular embodiment, the standing unbalance condition may be determined by comparing a magnitude of negative-sequence current with a magnitude of positive-sequence current. For example, if the negative-sequence current exceeds a predetermined factor of the positive-sequence current before the fault condition, then a standing unbalance condition may be declared. When a standing unbalance condition is declared, the sequence current supervision signal $S_I$ may be reduced for a fault that may follow; or even forced to zero, effectively eliminating the sequence current portion of the sequence polarizing signal $S_{POL-S}$. Accordingly, when the current signal is less accurate due to standing unbalance condition, the improvement herein reduces the contribution of the current signal to the polarizing signal, thus improving the distance protection element.

In yet another embodiment, the current supervising signal $S_I$ may be determined based on detection of a CT saturation condition. Clearly, when a CT exhibits a saturation condition, the current signal therefrom may be less accurate; and sequence currents calculated using the current from that CT are similarly less accurate. The CT saturation condition may be determined using the phase current signals. When the CT saturation condition is detected, the sequence current supervision signal $S_I$ may be reduced; or even set to zero, effectively eliminating the sequence current portion of the sequence polarizing signal $S_{POL-S}$. Accordingly, when sequence current signals are less accurate due to a CT saturation condition, the improvement herein reduces the contribution of the current signal to the polarizing signal, thus improving the distance protection element.

In various embodiments, the sequence current supervision signal $S_I$ may be reduced or even forced to zero upon detection of any of the above conditions, namely, insufficient sequence current magnitude, open-pole condition, three-phase fault, standing unbalance, CT saturation, and the like. In various other embodiments, the sequence current supervision signal $S_I$ may be reduced or forced to zero only upon detection of a combination of the above conditions. The sequence current supervision signal $S_I$ may be provided to the polarizing signal calculator for calculation of the sequence polarizing signal $S_{POL-S}$ in accordance with Equations 8-13.

Although separate calculators are described above as alternative embodiments for sources of the voltage supervision 552, current coefficients 554, and current supervision 556, such may be calculated directly in the polarizing signal calculator 414 or outside of the distance protection element 420. User settings for the voltage supervising factor, current coefficients, and current supervising factor may be stored in storage media for retrieval and use in the distance protection element 420.

It should also be noted that the distance protection element 420 of several embodiments herein may not use the loop current comparator 434, but instead use only the sequence quantity comparator 436, comparing the sequence polarizing signal $S_{POL-S}$ and the operating signal $S_{OP}$, wherein the sequence polarizing signal $S_{POL-S}$ includes a sequence current portion and a sequence voltage portion, that are each weighted as described herein. Accordingly, the system will detect a fault within the zone of protection when the comparison of the operating signal $S_{OP}$ and the sequence polarizing signal $S_{POL-S}$ is satisfied (e.g. when the angle therebetween is within a predetermined threshold).

While specific embodiments and applications of the disclosure have been illustrated and described, it is to be understood that the disclosure is not limited to the precise configurations and components disclosed herein. Moreover, principles described herein may also be utilized for distance protection and directional overcurrent protection. Accordingly, many changes may be made to the details of the above-described embodiments without departing from the underlying principles of this disclosure. The scope of the present invention should, therefore, be determined only by the following claims.

What is claimed is:

1. An electric power delivery system protection system, comprising:
    a signal processing subsystem to obtain power system quantities related to voltages and currents of the electric power delivery system;
    a protection element to:
        determine a distance element operating signal from the power system quantities;
        calculate sequence currents from the power system quantities;
        calculate sequence voltages from the power system quantities;
        calculate a polarizing signal as a sum of:
            a supervised combination of sequence currents; and
            a supervised voltage;
        determine a phase difference between the polarizing signal and the operating signal; and,
        assert a protective action when the phase difference is below an operating threshold.

2. The system of claim 1, wherein the supervised voltage comprises a product of the sequence voltage and a voltage supervision factor.

3. The system of claim 2, wherein the voltage supervision factor comprises a user setting.

4. The system of claim 2, wherein the voltage supervision factor comprises a function of a ratio of a nominal current to a nominal voltage.

5. The system of claim 2, wherein the sequence voltage comprises positive-sequence voltage, and the supervised voltage comprises the positive-sequence voltage.

6. The system of claim 1, wherein the supervised voltage comprises one selected from the group consisting of: a positive-sequence voltage; a cross-phase voltage; a present voltage value; a memorized voltage value; and combinations thereof.

7. The system of claim 1, wherein
the supervised combination of sequence currents comprises a sum of:
a product of the zero-sequence currents and a first current coefficient; and
a product of the negative-sequence currents and a second current coefficient.

8. The system of claim 7, wherein the first and second current coefficients comprise user settings.

9. The system of claim 1, wherein the supervised combination of sequence currents equally weights the sequence currents.

10. The system of claim 1, wherein the supervised combination of sequence currents comprises a product of the combination of sequence currents and a current supervision factor.

11. The system of claim 10, wherein the current supervision factor comprises a user setting.

12. The system of claim 10, wherein the protection element is further configured to determine the current supervision factor based on detection of insufficient negative-sequence current magnitude.

13. The system of claim 10, wherein the protection element is further configured to determine the current supervision factor based on detection of a standing unbalance condition.

14. The system of claim 10, wherein the protection element is further configured to determine the current supervision factor based on detection of a current transformer saturation condition.

15. The system of claim 10, wherein the protection element is further configured to determine the current supervision factor based on detection of an open pole condition.

16. The system of claim 10, wherein the protection element is further configured to determine the current supervision factor based on detection of a three-phase fault.

17. The system of claim 10, wherein the current supervision factor comprises zero upon detection of one or more of: insufficient negative-sequence current magnitude; standing unbalance; current transformer saturation; open pole; and, three-phase fault.

18. A method to determine a fault within a underreaching zone of protection of an electric power delivery system, comprising:
an intelligent electronic device in communication with the electric power delivery system obtaining electric power system quantities related to voltages and currents of the electric power delivery system;
determining a distance element operating signal from the power system quantities;
calculate sequence currents from the power system quantities;
calculate sequence voltages from the power system quantities;
calculate a polarizing signal as a sum of:
a supervised combination of sequence currents; and
a supervised voltage;
determine a phase difference between the polarizing signal and the operating signal; and,
assert a protective action when the phase difference is below an operating threshold.

19. The method of claim 18, wherein the supervised combination of sequence currents comprises a product of a sequence current supervising factor and a combination of sequence currents, further comprising:
determining the sequence current supervising factor based on a power system condition.

20. The method of claim 19, wherein the power system condition comprises one or more of: insufficient negative-sequence current magnitude; standing unbalance; current transformer saturation; open pole; and, three-phase fault.

21. The method of claim 18, wherein the supervised voltage comprises a product of the sequence voltage and a voltage supervising factor.

* * * * *